(12) United States Patent
Tomaru (10) Patent No.: US 10,345,583 B2
(45) Date of Patent: Jul. 9, 2019

(54) ILLUMINATION STRUCTURE (71) Applicant: CALSONIC KANSEI CORPORATION, Saitama (JP)

(72) Inventor: Kazunori Tomaru, Saitama (JP)

(73) Assignee: CALSONIC KANSEI CORPORATION (JP)

(*) Notice: Subject to any disclaimer, the term of this patent is extended or adjusted under 35 U.S.C. 154(b) by 0 days.

(21) Appl. No.: 15/766,709

(22) PCT Filed: Oct. 14, 2016

(86) PCT No.: PCT/JP2016/080475
§ 371 (c)(1),
(2) Date: Apr. 6, 2018

(87) PCT Pub. No.: WO2017/090335
PCT Pub. Date: Jun. 1, 2017

(65) Prior Publication Data
US 2018/0321489 A1  Nov. 8, 2018

(30) Foreign Application Priority Data
Nov. 24, 2015 (JP) .................................. 2015-228697

(51) Int. Cl.
*G02B 27/01* (2006.01)
*F21V 7/09* (2006.01)
(Continued)

(52) U.S. Cl.
CPC ........ *G02B 27/0101* (2013.01); *F21V 7/0083* (2013.01); *F21V 7/041* (2013.01); *F21V 7/09* (2013.01); *G02B 19/0019* (2013.01); *G02B 19/0061* (2013.01); *F21Y 2115/10* (2016.08); *G02B 2027/0118* (2013.01)

(58) Field of Classification Search
CPC ............ G02B 27/0101; G02B 19/0019; F21V 7/0083; F21V 7/041; F21V 7/09
See application file for complete search history.

(56) References Cited

U.S. PATENT DOCUMENTS

2013/0201690 A1  8/2013  Vissenberg et al.

FOREIGN PATENT DOCUMENTS

| CN | 103201555 A | 7/2013 |
|---|---|---|
| EP | 2792936 A2 | 10/2014 |

(Continued)

OTHER PUBLICATIONS

English translation of JP 2013-247038 (Year: 2013).*
International Search Report from PCT/JP2016/080475 dated Dec. 6, 2016 (English Translation), 1 page.

*Primary Examiner* — Anne M Hines
(74) *Attorney, Agent, or Firm* — Calfee, Halter & Griswold LLP (57) ABSTRACT

An illumination structure includes a substrate having a front surface on which a light source is attached, and a reflector arranged on the front surface of the substrate to surround the light source, wherein the reflector includes a reflection wall part having a regular pyramid-like shape, and four inside surfaces of the reflection wall part having the regular pyramid-like shape include steep slope parts, respectively, having an angle larger than 7.5 degrees and smaller than 15 degrees with respect to a direction of an optical axis of the light source as a standard.

5 Claims, 5 Drawing Sheets

(51) Int. Cl.
*F21V 7/00* (2006.01)
*F21V 7/04* (2006.01)
*G02B 19/00* (2006.01)
*F21Y 115/10* (2016.01)

(56) References Cited

FOREIGN PATENT DOCUMENTS

| | | |
|---|---|---|
| JP | 2001282118 A | 10/2001 |
| JP | 2010211065 A | 9/2010 |
| JP | 2011090949 A | 5/2011 |
| JP | 2013171874 A | 9/2013 |
| JP | 2013247038 A | 12/2013 |
| TW | 201221834 A | 6/2012 |
| WO | 201204242429 A2 | 4/2012 |

\* cited by examiner

ILLUMINATION STRUCTURE

CROSS-REFERENCE TO RELATED APPLICATION

The present application is based on and claims priority from Japanese Patent Application No. 2015-228697, filed on Nov. 24, 2015, the disclosure of which is hereby incorporated by reference in its entirety.

TECHNICAL FIELD

This disclosure relates to an illumination structure.

BACKGROUND ART

For example, various types of display devices are provided in an interior of a vehicle such as an automobile. The display device includes an illumination device such as a backlight capable of illuminating a display part.

For example, a backlight described in Patent Literature 1 (see, for example, JP 2001-282118A) includes a substrate having a front surface on which a light source (LED) is attached and a reflector (reflection member) arranged on the front surface of the substrate to surround the light source.

SUMMARY

However, the backlight described in Patent Literature 1 hardly uses the light reflected by the reflector. For this reason, the illumination efficiency of such a backlight is lowered, and the backlight cannot obtain sufficient luminance.

This disclosure is made to solve the above problem.

To solve the above problem, this disclosure provides an illumination structure including a substrate having a front surface on which a light source is attached and a reflector arranged on the front surface of the substrate to surround the light source, wherein the reflector includes a reflection wall part having a regular pyramid-like shape, and four inside surfaces of the reflection wall part having the regular pyramid-like shape include steep slope parts, respectively, having an angle larger than 7.5 degrees and smaller than 15 degrees with respect to a direction of an optical axis of the light source as a standard.

DETAILED DESCRIPTION

Hereinafter, an embodiment is described in details with reference to the drawings.

FIGS. 1 to 8 are views for describing the embodiment.

<Configuration> Hereinafter, a configuration of the embodiment is described.

Figure 1:
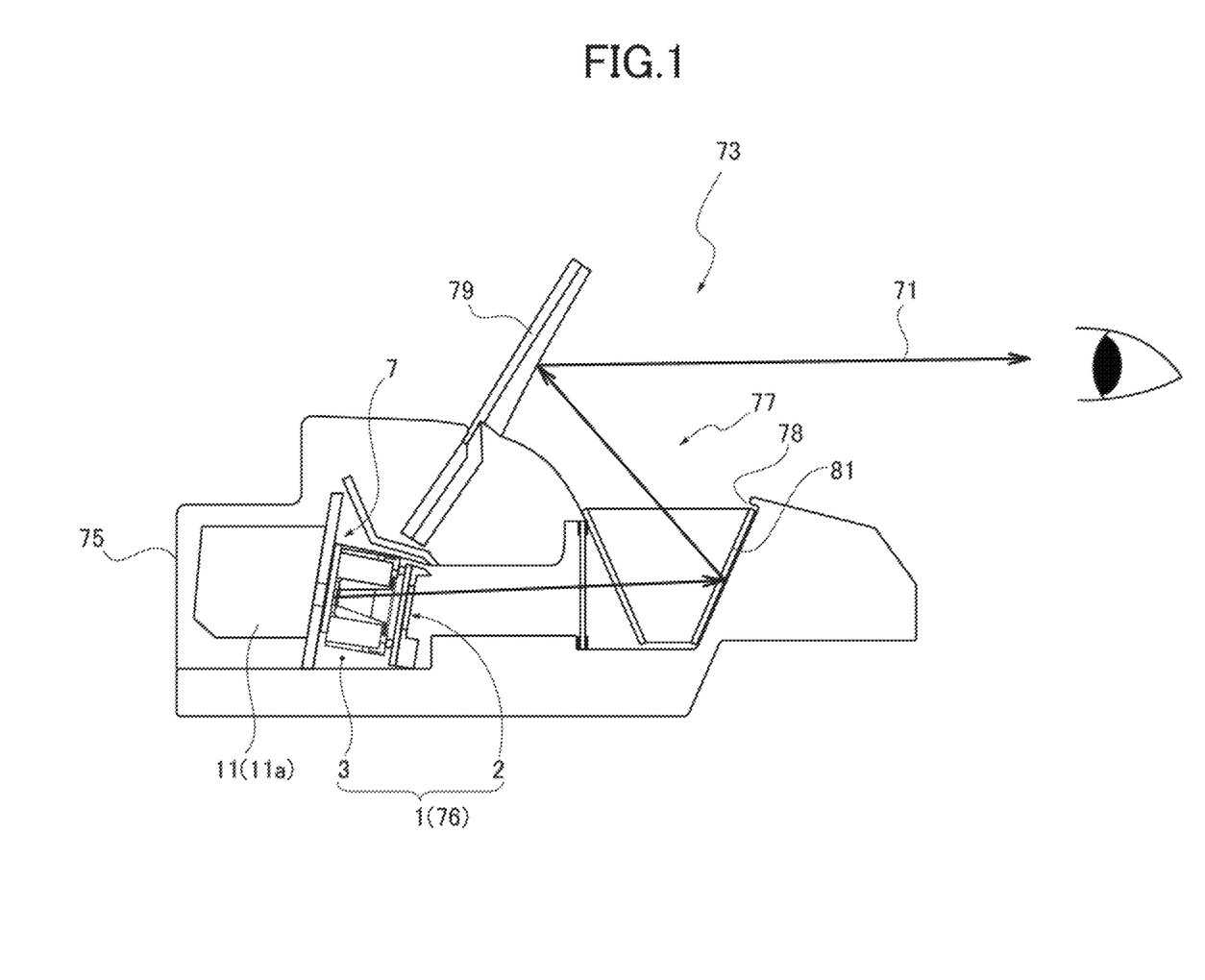
FIG. 1 is a longitudinal sectional view of a head-up display device using a display device including an illumination structure according to an embodiment.
Figure 2:
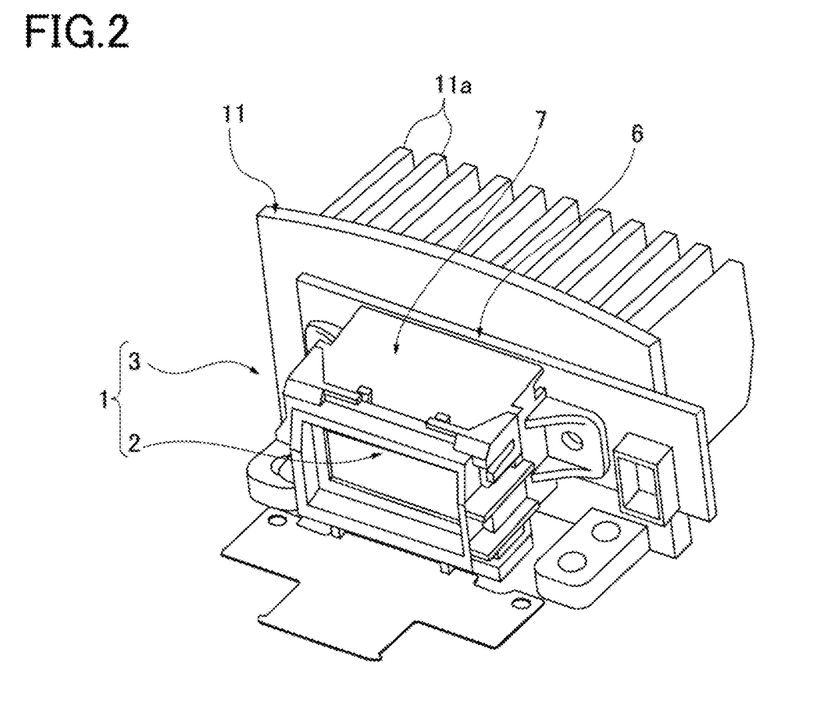
FIG. 2 is an entire perspective view of the display device in FIG. 1.
Figure 3:
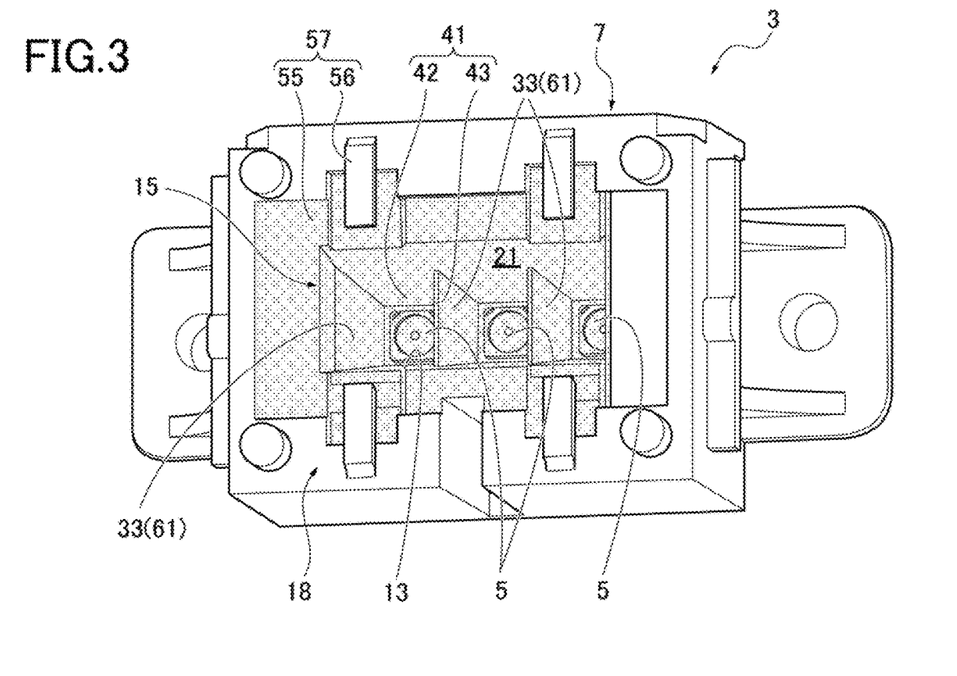
FIG. 3 is a perspective view of the illumination structure (backlight) in the display device from which a display part is detached.

For example, various types of display devices are provided in an interior of a vehicle such as an automobile. As illustrated in FIG. 1 (FIG. 2), a display device 1 includes a display part 2 and a backlight 3 (illumination device) that illuminates the display part 2 from a rear surface thereof. The display device 1 can illuminate the display part 2 by the backlight 3.

As illustrated in FIGS. 3 to 6 (refer to mainly FIG. 5), the backlight 3 includes a substrate 6 having a front surface on which a light source 5 is provided and a reflector 7 arranged on the front surface of the substrate 6 to surround the light source 5.

In this case, for example, an LED is used for the light source 5. The LED is a commonly used LED having an illumination angle of about 60 degrees on one side (about 120 degrees on both sides) with respect to an optical axis 8. A light emitting part of the commonly used LED has an approximate square shape in a planar view.

A heatsink 11 (refer to FIG. 2) including a fin 11a for heat dissipation is attached on a rear surface of the substrate 6. The heatsink 11 is made of, for example, metal having favorable heat conductivity such as aluminum.

The reflector 7 is a tubular-like or a frame-like light guiding component. The reflector 7 includes, in a base part thereof (rear surface), a base plate contact part 12 that contacts the substrate 6. The reflector 7 includes, on a leading end side thereof (front surface side) an emission part 13 that emits light 14 (refer to FIG. 5) from the light source 5.

More specifically, the reflector 7 is a double-structured resin member including a reflection wall part 15 and an outer circumference wall part 16. The reflection wall part 15 directly surrounds the light source 5 to reflect the light 14 from the light source 5 toward the emission part 13. The outer circumference wall part 16 surrounds outside the reflection wall part 15. An inside surface of the reflection wall part 15 is a reflection surface. A leading end part of the reflection wall part 15 and a leading end part of the outer circumference wall part 16 are integrally connected by a frame-like connection surface part 18. An inside (opening) of the frame-like connection surface part 18 is defined as the emission part 13. The emission part 13 is connected to the inside surface of the reflection wall part 15.

An inside of the reflection wall part 15 is defined as a lamp room 21 (illumination room) that houses the light source 5. A surrounding space 22 that surrounds outside the lamp room 21 is provided between the reflection wall part 15 and the outer circumference wall part 16.

The emission part 13 has substantially the same size as an illumination region of the light source 5 for the display part 2.

The backlight 3 is disposed in the display device 1 such that the emission part 13 faces the rear surface of the display part 2. The display device 1 can thereby illuminate the display part 2. The display part 2 may be a dial plate or a liquid crystal panel. The display device 1 including the display part 2 as a dial plate may be used for a meter. The display device 1 including the display part 2 as a liquid crystal panel may be used for a liquid crystal display device. The display part 2 may be a display part in which a dial plate and a liquid crystal panel are combined.

The illumination structure of this embodiment includes the following configurations with respect to the above-described display device 1 and backlight 3.

Figure 4:
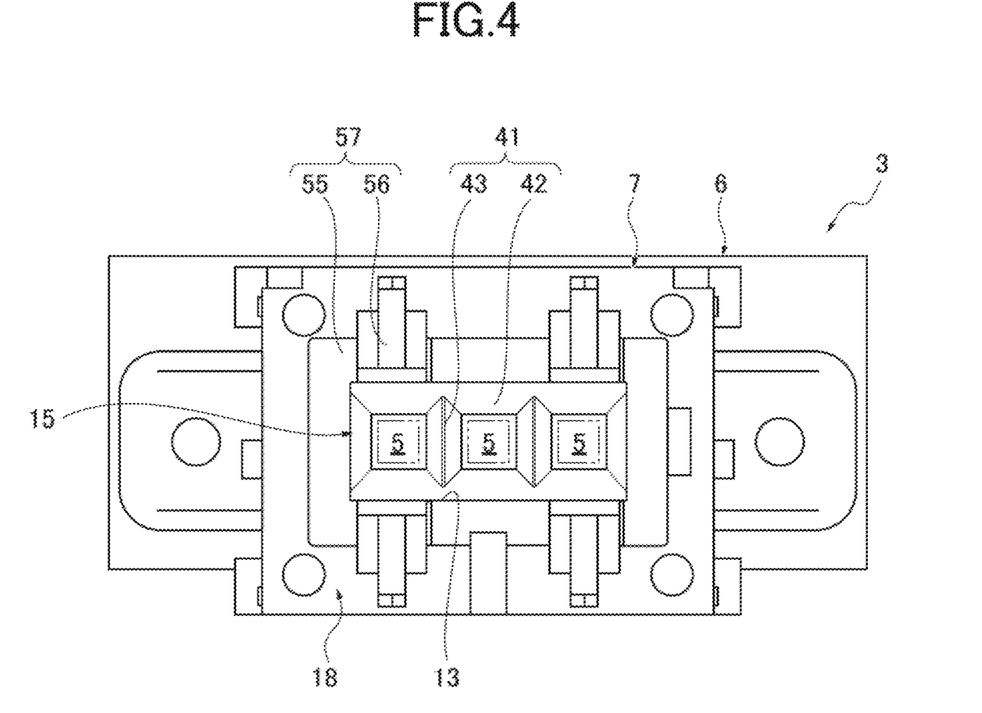
FIG. 4 is a front view of FIG. 3.
Figure 5:
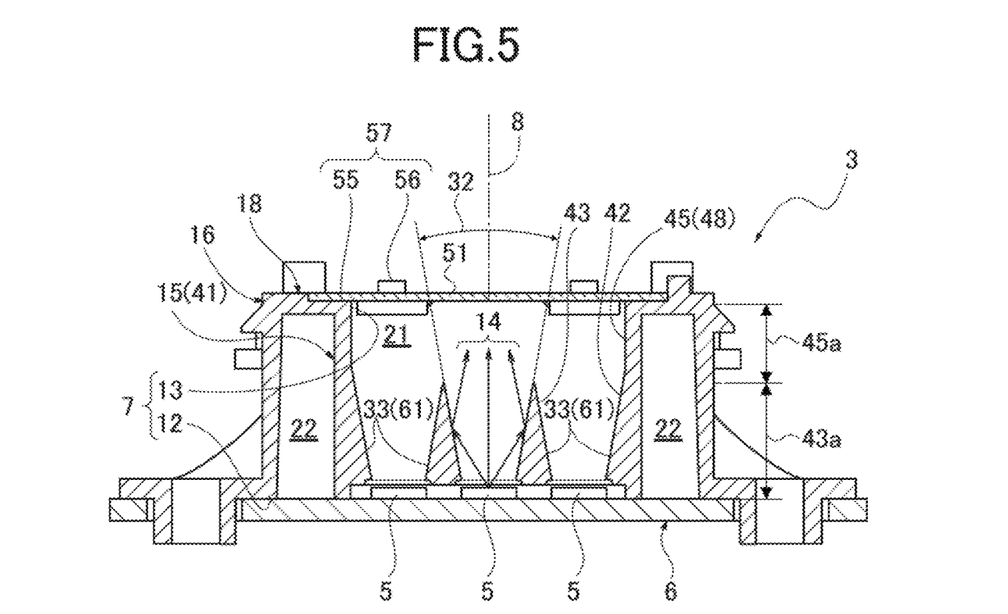
FIG. 5 is a transverse sectional view of the illumination structure in FIG. 3.
Figure 6:
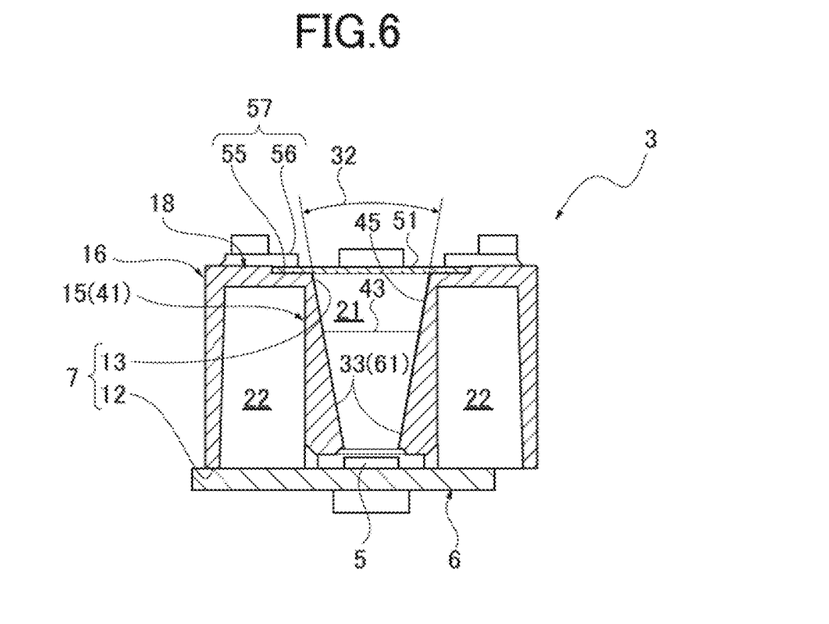
FIG. 6 is a longitudinal sectional view of the illumination structure in FIG. 3.

(1) The reflector 7 includes the reflection wall part 15 having a regular pyramid-like shape (refer to FIG. 4). The four inside surfaces of the reflection wall part 15 having a regular pyramid-like shape include steep slope parts 33, respectively, having an angle 32. The steep slope part 33 can absorb and control uneven luminance while maintaining maximum luminance 31 (refer to FIG. 7) of the light source 5. More specifically, the steep slope part 33 has the angle 32 larger than 7.5 degrees and smaller than 15 degrees with respect to the direction of the optical axis 8 of the light source 5 as a standard.

In this case, the regular pyramid-like shape means a square pyramid in a square cross section. As described above, as the reflection wall part 15 (inside surfaces) has the regular pyramid-like shape, the reflection wall part 15 includes a planar shape similar to that of a light emitting part of the light source 5 having a square shape in a planar view. The reflection wall part 15 having the regular pyramid-like shape is disposed such that the center of the reflection wall part 15 is substantially aligned with the center of the light emitting part of the light source 5, and the respective sides are arranged in parallel to each other. The base part of the reflection wall part 15 has a rectangular shape slightly larger than that of the light emitting part of the light source 5, so as to avoid interference with the light emitting part of the light source 5.

The maximum luminance 31 of the light source 5 is the maximum luminance obtained by condensing the light 14 from the light source 5. The maximum luminance 31 allows a decrease in luminance by about less than 5%. The uneven luminance means a large luminance difference between a bright part and a dark part. The uneven luminance is decided based on visual recognition of a human. The uneven luminance is recognized by many people when the luminance difference between the center part (bright part) and the circumference part (dark part) becomes twice or more.

The steep slope has an angle smaller than 45 degrees with respect to the direction of the optical axis 8 as a standard. On the other hand, the gentle slope has an angle larger than 45 degrees with respect to the direction of the optical axis 8 as a standard.

The steep slopes of the four inside surfaces of the reflection wall part 15 increase the ratio of the light (reflection light), which is reflected by the inside surfaces of the reflection wall part 15, to the direct light, which has directly passed without being reflected by the inside surfaces of the reflection wall part 15 of the reflector 7, in the light 14 from the light source 5. The condensing effect is thereby improved, and high luminance is obtained. On the other hand, the gentle slope of the four inside surfaces of the reflection wall part 15 decreases the ratio of the reflection light to the direct light. The condensing effect is thereby decreased, and the low luminance may be only obtained.

The luminance difference between the center part and the circumference part is increased, which thus increases the uneven luminance (refer to point A1 of FIG. 7), in accordance with a decrease in the angle 32 of the inside surface, as in the case of increasing the condensing effect by the steep slopes of the four inside surfaces of the reflection wall part 15. On the other hand, the luminance difference between the center part (bright part) and the circumference part (dark part) is decreased, which thus decreases the uneven luminance (refer to points A2, A5 in FIG. 7. Note that the data image of the uneven luminance differs between a black and white image and a color image), in accordance with an increase in the angle 32 of the inside surface, as in the case of lowering the condensing effect by the gentle slopes of the four inside surfaces of the reflection wall part 15.

Accordingly, the improvement in luminance and the decrease in uneven luminance are obtained by the opposing configurations. The maximum illumination effect is achieved when the angle 32 of the inside surfaces of the reflection wall part 15 which leads the best balance of the improvement in luminance and the decrease in uneven luminance is obtained.

Figure 7:
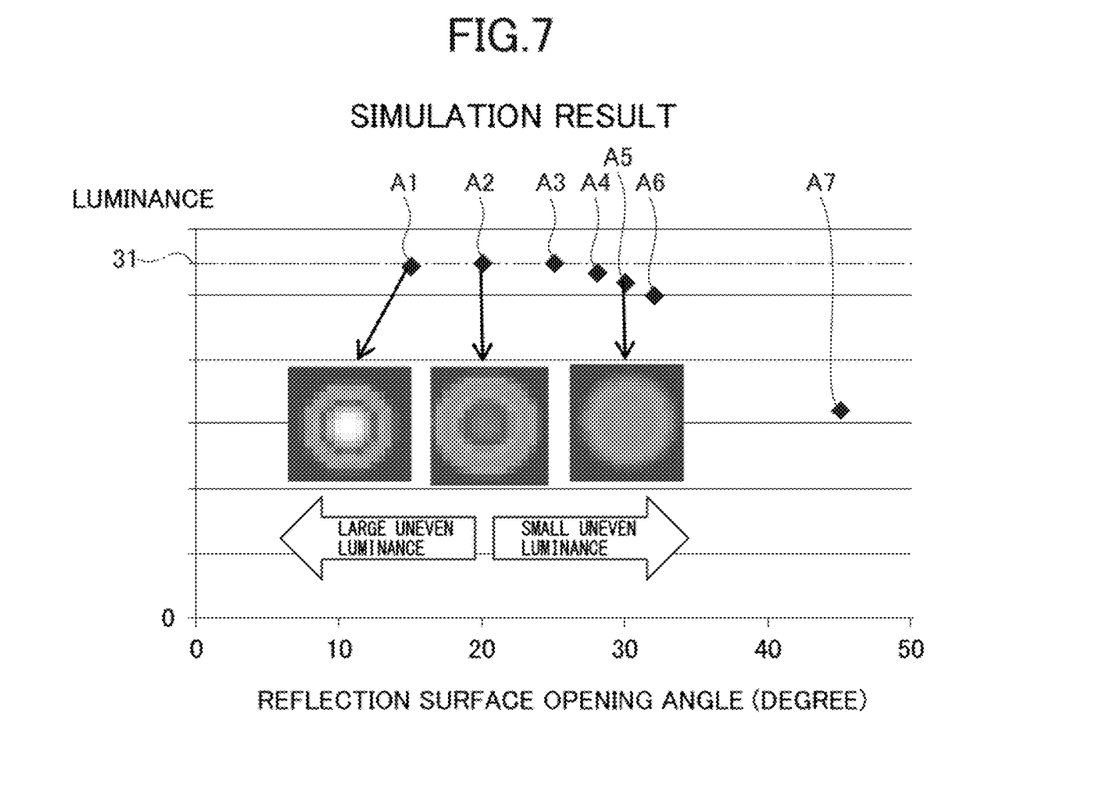
FIG. 7 is a graph showing a result of simulation based on an angle of a reflection wall changed into various angles.

A simulation was therefore executed by variously changing the angle 32 of the reflection wall part 15. FIG. 7 shows the result of the simulation. According to this graph, the maximum luminance 31 is obtained at the following angles of the angle 32 of the reflection wall part 15; 15 degrees (point A1, 7.5 degrees on one side with respect to the direction of the optical axis 8 as a standard), 20 degrees (point A2, 10 degrees on one side with respect to the direction of the optical axis 8 as a standard), and 25 degrees (point A3, 12.5 degrees on one side with respect to the direction of the optical axis 8 as a standard). It was also confirmed that the luminance was gradually decreased in accordance with the increase in the angle 32 of the reflection wall part 15 such as 28 degrees (point A4, 14 degrees on one side with respect to the direction of the optical axis 8 as a standard) and 30 degrees (point A5, 15 degrees on one side with respect to the direction of the optical axis 8 as a standard). As the stable values (maximum luminance 31) were obtained from 15 to 25 degrees (points A1 to A3), it was estimated that higher luminance could not be obtained when the angle 32 of the reflection wall part 15 was set to 15 degrees or below.

Next, the uneven luminance was determined to the above simulation results of the luminance. At 15 degrees (point A1), the luminance difference was twice or more and the distinguished uneven luminance was confirmed. At 20 degrees (point A2) and 30 degrees (point A5), the luminance difference was twice or below and the distinguished uneven luminance was not confirmed. More specifically, the uneven luminance at 20 degrees and 30 degrees was decreased to be smaller than that at 15 degrees.

Consequently, it was found that the angle 32 which obtained the best balance of the luminance and the uneven luminance fell within a range (points A2 to A4) larger than 15 degrees (7.5 degrees on one side) and smaller than 30 degrees (15 degrees on one side). It was confirmed that the most efficient illumination was obtained if the steep slope part 33 (inside surface of reflection wall part 15) was set to the angle 32 within the range of 20 degrees to less than 30 degrees on the both sides (10 degrees to less than 15 degrees on one side) with respect to the direction of the optical axis 8 as a standard. In addition, at 28 degrees (14 degrees on one side) (point A4), the luminance was slightly lower than the maximum luminance 31. However, it was confirmed that such a decrease fell within an allowable range. It is preferable for the steep slope part 33 to be a slope having the fixed angle 32.

(2) A plurality of light sources 5 may be arranged side by side on the substrate 6 as a specific structure. The reflection wall part 15 of the reflector 7 (regular pyramid-like shape) may be provided in each of the light sources 5, and a plurality of reflection wall parts 15 may be integrally connected to be a connected reflection part 41. The connected reflection part 41 may include a frame wall part 42 that defines the entire external shape and a dividing wall 43 that divides the inside of the frame wall part 42 into square shapes. The frame wall part 42 may include an extended part 45 extending along the optical axis direction of the light source 5 to be longer than the dividing wall 43.

The number of light sources 5 to be disposed is determined based on a shape and a size of the display part 2 and luminance required for illuminating the display part 2. The height of the reflector 7 and the arrangement of a plurality of light sources 5 with respect to the substrate 6 are determined based on a shape and a size of the display part 2 and the angle 32 of the reflection wall part 15. In this case, three light sources 5 are arranged side by side.

In this case, the height of the dividing wall 43 of the connected reflection part 41 is set to a position where the neighboring inside surfaces (steep slope parts 33) of a plurality of reflection wall parts 15 intersect one another. If the frame wall part 42 of the connected reflection part 41 has the same height as the dividing wall 43, the shadow of the leading end part of the dividing wall 43 may strongly appear in the emission part 13 of the reflector 7. For this reason, as described above, the extended part 45 is provided in the frame wall part 42 so as to expand the light 14 from the light source 5 outside the leading end part of the dividing wall 43 within the extended part 45.

In order to prevent the shadow of the leading end part of the dividing wall 43 from strongly appearing in the emission part 13, it is preferable to set a length 45a of the extended part 45 to a length about 0.5 times a height 43a of the dividing wall 43 or more. If the length 45a of the extended part 45 is too long, the distance from the light source 5 to the emission part 13 becomes too long. For this reason, it is preferable to set the length 45a of the extended part 45 to a length about 1.0 times the height 43a of the dividing wall 43 at the maximum. In this embodiment, the length 45a of the extended part 45 is set to a length about 0.7 times the height 43a of the dividing wall 43.

The extended part 45 may be configured only by the steep slope part 33. However, when it is necessary to adjust the shape of the frame wall part 42 to suit the shape and the size of the display part 2 (or emission part 13), at least a part of the inside surface of the extended part 45 may be a vertical surface part 48 partially perpendicular to the optical axis 8 according to the display part 2 (or emission part 13).

(3) A diffuser plate 51 that diffuses the light 14 from the light source 5 may be provided on the front surface side of the reflector 7.

The front surface side of the reflector 7 is the emission part 13. The diffuser plate 51 (diffuser sheet or diffuser filter) is an optical member that diffuses the light 14 from the light source 5 to be equalized. The diffuser plate 51 is supplementary used according to needs to prevent the luminance from being remarkably decreased. A diffuser plate attachment part 57 is provided in the connection surface part 18 of the reflector 7 along the edge part of the emission part 13 so as to attach the diffuser plate 51. The diffuser plate attachment part 57 is, for example, a concave part 55 or a claw part 56. When a plurality of reflection wall parts 15 each having a regular pyramid-like shape is provided, only one diffuser plate 51 is provided in the entire structure.

(4) A mirror reflection layer 61 may be provided at least in the inside surface of the reflection wall part 15 of the reflector 7.

The mirror reflection layer 61 is, for example, an aluminum deposition layer. The mirror reflection layer 61 may be disposed only in the inside surface of the reflection wall part 15. In this case, the mirror reflection layer 61 is formed in the entire reflector 7.

(5) As illustrated in FIG. 1, a head-up display device 73 that projects forward (driver's seat in vehicle) an image 71 displayed on the display device 1 may be provided. The display device 1 includes the backlight 3 for illuminating the image 71. The backlight 3 includes the reflector 7.

The head-up display device 73 includes, inside a housing 75, an image forming device 76 and an optical path 77 that guides the image 71 formed by the image forming device 76 outside the housing 75.

The housing 75 is provided with an opening 78 from which the image 71 guided to the optical path 77 is guided outside. The opening 78 is provided with a combiner 79 (for example, translucent projection member) that projects the image 71. A reflection mirror 81 that reflects the image 71 to be guided to the combiner 79 is appropriately provided in the middle of the optical path 77.

The image forming device 76 is the above-described display device 1. The display device 1 includes the display part 2 and the backlight 3 that illuminates the display part 2 from the rear surface thereof, as described above. The display part 2 is a liquid crystal panel.

<Operation> Hereinafter, the operations of the embodiment are described.

Upon turning on the light source 5 attached to the substrate 6, the light 14 from the light source 5 is emitted from the emission part 13 provided on the leading end side of the reflector 7 through the inside of the reflector 7 arranged on the front surface of the substrate 6. The display part 2 provided on the leading end side of the reflector 7 is illuminated.

In this case, the light 14 from the light source 5 is condensed by combining the light (direct light) that has directly passed through the inside of the reflector 7 without being reflected and the light (reflected light) that is reflected by the reflector 7 (reflection wall part 15). By condensing the light 14 from the light source 5 to be irradiated, the luminance is increased to brighten the illumination.

<Effect> The following effects can be obtained according to the embodiment.

(Effect 1) The shape of the reflection wall part 15 is changed as described above, in order to optimize the reflector 7. More specifically, the reflection wall part 15 of the reflector 7 has the regular pyramid-like shape similar to the planar shape of the light emitting part of the light source 5. The four inside surfaces of the reflection wall part 15 having the regular pyramid-like shape are the steep slope parts 33 having the angle 32 capable of absorbing and controlling the uneven luminance while guaranteeing the maximum luminance 31 of the light source 5. More specifically, the steep slope part 33 has the angle 32 larger than 7.5 degrees and smaller than 15 degrees with respect to the direction of the optical axis 8 of the light source 5 as a standard. The light 14 from the light source 5 can be thereby substantially equally and effectively reflected by the entire circumference. As a result, higher luminance can be obtained while eliminating the uneven luminance, and thus the illumination efficiency can be improved. Accordingly, in order to obtain the same luminance, for example, the number of light sources 5 is decreased or the low luminance light source 5 is used. The costs required for the illumination structure can be thereby reduced. On the other hand, if the reflection surfaces of the reflector have a rectangular pyramid-like shape (square pyramid-like shape in rectangular cross section), and each surface of the reflection surfaces having a rectangular pyramid-like shape has a gentle slope which expands the light at about 60 degrees on one side (120 degrees on both sides) with respect to the optical axis of the light source, the light reflected by the reflector is hardly used, which lowers the illumination efficiency. Thus, sufficient luminance cannot be obtained. Such an angle is substantially equal to the irradiation angle (120 degrees) of a common light source (LED).

(Effect 2) When a plurality of light sources 5 is arranged side by side, a plurality of reflection wall parts 15 each having a regular pyramid-like shape may be connected to obtain the connected reflection part 41, and the extended part 45 extending along the optical axis direction of the light source 5 to be longer than the dividing wall 43 may be provided in the frame wall part 42 of the connected reflection part 41. The light 14 from each light source 5 can be thereby extended outside the leading end part of each dividing wall 43 by the length 45a of the extended part 45. Therefore, as shown in FIG. 8, the uneven luminance can be decreased, and the shadow of the leading end part of the dividing wall 43 can be controlled in the emission part 13 of the reflector 7.

(Effect 3) The diffuser plate 51 may be provided on the front surface side of the reflector 7. The diffuser plate 51 is thereby disposed according to needs so as to diffuse the light 14 from the light source 5 by the diffuser plate 51. The uneven luminance can be further decreased.

Figure 8:
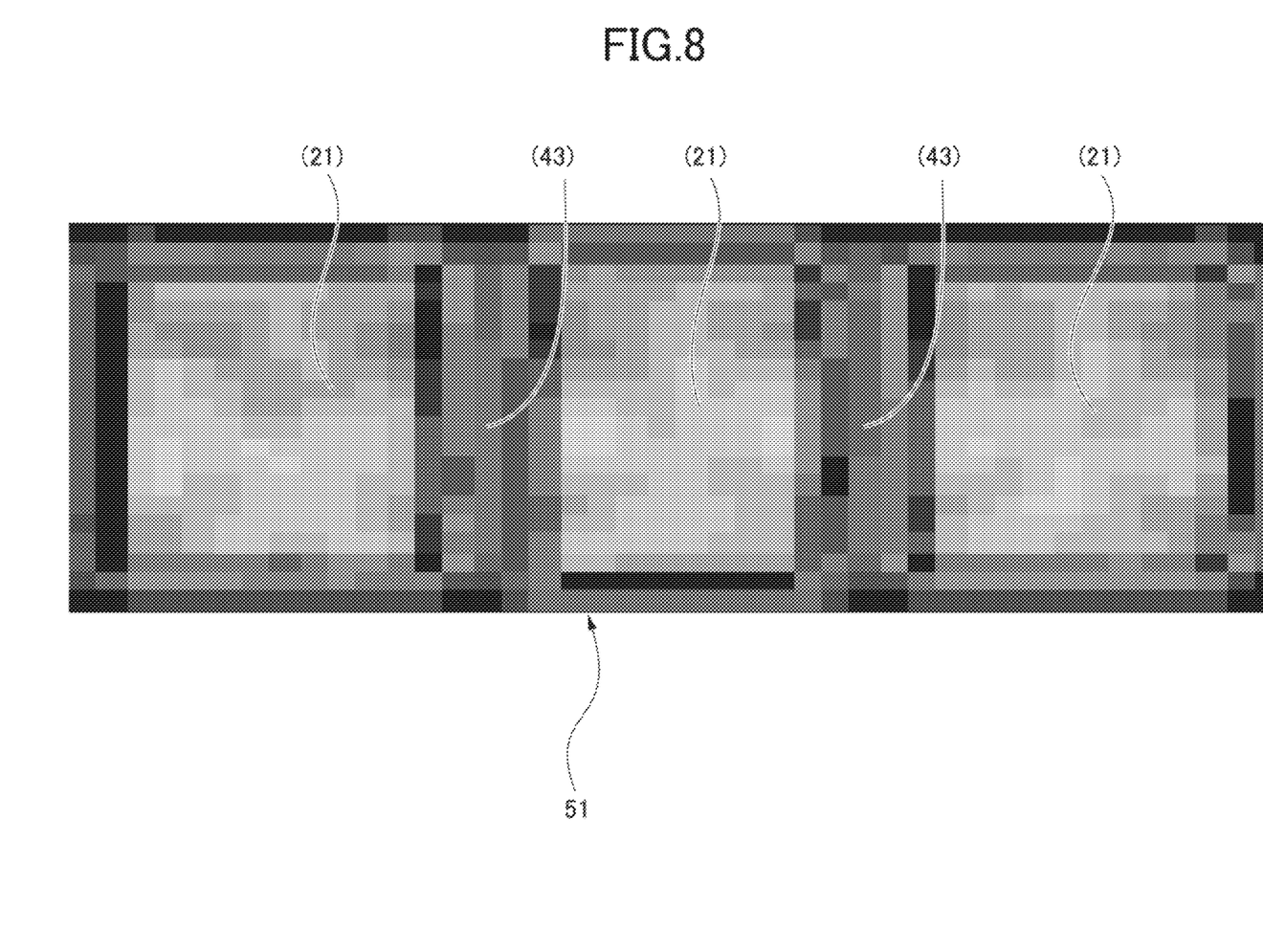
FIG. 8 is a simulation view showing uneven luminance when an extended part and a diffuser plate are provided.

FIG. 8 is a view showing the uneven luminance when the extended part 45 and the diffuser plate 51 are provided. It is confirmed from FIG. 8 that the uneven luminance is decreased in the portion of each lamp room 21 (illumination room) (in addition, the data image of the uneven luminance differs between a color image and a black and white image), and the shadow of the leading end part of the dividing wall 43 does not strongly appear to fall within an allowable range.

(Effect 4) The mirror reflection layer 61 may be provided at least in the inside surface of the reflection wall part 15 of the reflector 7. The illumination efficiency can be further improved by reflecting the light 14 with the mirror reflection layer 61 (increase in reflection rate) without wasting the light 14.

(Effect 5) The head-up display device 73 projects the image 71 formed by the display device 1 to be displayed as a virtual image such that the image 71 comes into a sight of a driver facing front. The backlight 3 including the reflector 7 may be applied to such a head-up display device 73. The illumination efficiency of the backlight 3 in the head-up display device 73 can be thereby improved. Thus, the brighter head-up display device 73 can be obtained.

Although the embodiment has been described with reference to the drawings, it should be understood that the embodiment is only an example of this disclosure. This disclosure should not be limited to the embodiment, and it should be appreciated that variations or modifications may be made in the embodiments described by persons skilled in the art without departing from the gist of this disclosure. Further, when the embodiment includes a plurality of elements, any possible combinations of these elements may be possible even without a detailed description. Furthermore, when several embodiments are described in this disclosure, any possible combinations of these configurations that may even across these embodiments may be possible even without a detailed description. Additionally, when the term "and the like", is used, it means it covers similar elements. Further, when the terms "substantially", "about", "around", etc. are used, it should be considered that they cover ranges and/or accuracy within a technical common sense understood by persons skilled in the art.

What is claimed is:

1. An illumination structure comprising:
    a substrate having a front surface on which a light source is attached; and
    a reflector arranged on the front surface of the substrate to surround the light source, wherein
    the reflector comprises a reflection wall part having, in an inside surface thereof, four reflection surfaces having a regular truncated pyramid shape,
    the four reflection surfaces of the reflection wall part having the regular truncated pyramid shape comprise steep slope parts, respectively, expanding at an angle larger than 7.5 degrees and smaller than 15 degrees with respect to a direction of an optical axis of the light source, and
    each of the steep slope parts extends from a side of an emission part of the reflector toward a position of a corner between an upper surface and a side surface of a light emitting part of the light source such that the steep slope and the position are substantially adjacent.

2. The illumination structure according to claim 1, wherein
    a plurality of the light sources are arranged side by side on the substrate,
    a plurality of the reflection wall parts of the reflector are provided in each of the light sources, and the plurality of the reflection wall parts are integrally connected to be a connected reflection part,
    the connected reflection part comprises a frame wall part that defines an external shape of the entire connected reflection part and a dividing wall that divides an inside of the frame wall part into separate square shapes, and
    the frame wall part comprises an extended part extending along the direction of the optical axis of the light source to be longer than the dividing wall.

3. The illumination structure according to claim 1, wherein
    a diffuser plate that diffuses light from the light source is provided on a side of the front surface of the reflector.

4. The illumination structure according to claim 1, wherein
    a mirror reflection layer is provided at least in the inside surface of the reflection wall part of the reflector.

5. The illumination structure according to claim 1, wherein
    a head-up display device is provided, wherein the head-up display device projects an image displayed on a display device,
    the display device comprises a backlight that illuminates the image, and
    the backlight comprises the reflector.

* * * * *